(12) United States Patent
Kumar et al.

(10) Patent No.: US 10,831,534 B2
(45) Date of Patent: Nov. 10, 2020

(54) MAINFRAME DATA FLOW OPTIMIZATION FOR DATA INTEGRATION

(71) Applicant: Walmart Apollo, LLC, Bentonville, AR (US)

(72) Inventors: Nirav Kumar, Bengaluru (IN); Thanveer Ahmed, Bengaluru (IN); Harini Bontadkar, Bengaluru (IN); Maran Mk, Bengaluru (IN); Ernest Taylor, Bentonville, AR (US); Anbuchezhian Govindarajan, Bengaluru (IN)

(73) Assignee: Walmart Apollo, LLC, Bentonville, AR (US)

( * ) Notice: Subject to any disclaimer, the term of this patent is extended or adjusted under 35 U.S.C. 154(b) by 146 days.

(21) Appl. No.: 16/001,320

(22) Filed: Jun. 6, 2018

(65) Prior Publication Data
US 2019/0278629 A1  Sep. 12, 2019

(30) Foreign Application Priority Data
Mar. 12, 2018 (IN) .............................. 201811008966

(51) Int. Cl.
G06F 9/48 (2006.01)
G06F 11/07 (2006.01)
G06F 16/23 (2019.01)

(52) U.S. Cl.
CPC ........ *G06F 9/4881* (2013.01); *G06F 11/0745* (2013.01); *G06F 11/0751* (2013.01); *G06F 11/0769* (2013.01); *G06F 16/2358* (2019.01); *G06F 16/2379* (2019.01)

(58) Field of Classification Search
None
See application file for complete search history.

(56) References Cited

U.S. PATENT DOCUMENTS

| 7,636,776 B2 | 12/2009 | Shah et al. |
| 7,774,792 B2 | 8/2010 | Anderson et al. |
| 8,190,562 B2 | 5/2012 | Sanghvi et al. |

(Continued)

FOREIGN PATENT DOCUMENTS

WO  2006026636 A2  3/2006

OTHER PUBLICATIONS

International Search Report and Written Opinion from related International Patent Application No. PCT/US2019/021841 dated Jun. 7, 2019.

(Continued)

*Primary Examiner* — Eric C Wai
(74) *Attorney, Agent, or Firm* — McCarter & English, LLP

(57) ABSTRACT

Systems, methods, and machine readable media are provided for mainframe data flow optimization and integration. The system includes a computing device configured to execute a file process module, an average time calculation module, and a configuration updater module. The file process module when executed prepares a file list for a lookup, calls a workflow scheduler for a jobs list based on the file list for lookup, identifies newly created data files from a plurality of different systems from the jobs list, generates a trigger file for each newly created data file for every external system that requires the newly created file, and processes each trigger file and pushes the newly created files to an external system.

20 Claims, 10 Drawing Sheets

(56) References Cited

U.S. PATENT DOCUMENTS

| | | | |
|---|---|---|---|
| 8,214,517 B2 | 7/2012 | Dubnicki et al. | |
| 8,572,564 B2 | 10/2013 | Heuler et al. | |
| 9,619,546 B2 | 4/2017 | Suthar et al. | |
| 9,984,111 B2 * | 5/2018 | Fillipi | G06F 16/2343 |
| 10,452,644 B2 * | 10/2019 | Goda | G06F 9/48 |
| 2005/0105129 A1 | 5/2005 | Takahashi | |
| 2007/0162363 A1 | 7/2007 | Chollon et al. | |
| 2009/0089078 A1 | 4/2009 | Bursey | |
| 2013/0067017 A1 | 3/2013 | Carriere et al. | |

OTHER PUBLICATIONS

Spring Batch Introduction, docs.spring.io/spring-batch/trunk/reference/html/spring-batch-intro.html, last viewed Jan. 6, 2018.

* cited by examiner

US 10,831,534 B2

MAINFRAME DATA FLOW OPTIMIZATION FOR DATA INTEGRATION

CROSS REFERENCE TO RELATED APPLICATIONS

The present application claims the benefit of India Patent Application No. 201811008966, filed on Mar. 12, 2018, which is incorporated herein by reference in its entirety.

BACKGROUND

In a workplace environment, such as a large retail store, there is typically a need for many different computer systems to organize and manage the various aspects of the retail business. For example, there can be a need for managing employee schedules and payroll that can be met with a server/computer in an office area. There can be a need in the shipping area for a computerized system to monitor shipping schedules for the arrival of goods to the store, and the shipping of goods to customers. A separate computer system may be used to manage the store inventory. Overnight batch jobs may need to be run for bill payment and other financial matters in the accounting department. There are many different, possibly incompatible, computer platforms used in a retail store environment for running various jobs to keep the business running smoothly. Furthermore, each of the jobs running on a different platform may need to be individually monitored with separate periodic job summaries and displays to apprise management of crucial information.

SUMMARY

Currently, for every file that needs to be transferred to one or more external systems there are a number of tasks involved. These include developing mainframe jobs, testing, implementation, job scheduling, etc. Embodiments of the presently described mainframe data flow optimization framework for data integration includes a structured model, driven by configuration files, which automatically allows files to be transferred as they are created from mainframes to one or more external systems.

In one embodiment for a system for mainframe data flow optimization and integration, the system comprises a computing device configured to execute a file process module, an average time calculation module, and a configuration updater module. The file process module when executed prepares a file list for a lookup and calls a workflow scheduler for a jobs list. The file process module also identifies newly created data files from the jobs list, and generates a trigger file for each newly created file for each external system the file is to be delivered to. The file process module processes each trigger file and pushes the newly created file to on or more external systems.

In one embodiment of a method for mainframe data flow optimization and integration, the method includes executing a file process module, an average time calculation module, and a configuration updater module. The file process module when executed prepares a file list for a lookup and calls a workflow scheduler for a jobs list. The file process module also identifies newly created data files from the jobs list, and generates a trigger file for each newly created file for each external system the file is to be delivered to. The file process module processes each trigger file and pushes the newly created file to on or more external systems.

In one embodiment a non-transitory machine readable medium stores instructions that, when executed, causes a processing device to implement a method for mainframe data flow optimization and integration. The method includes executing a file process module, an average time calculation module, and a configuration updater module. The file process module also identifies newly created data files from the jobs list, and generates a trigger file for each newly created file for each external system the file is to be delivered to. The file process module processes each trigger file and pushes the newly created file to on or more external systems.

BRIEF DESCRIPTION OF THE DRAWINGS

The accompanying drawings, which are incorporated in and constitute a part of this specification, illustrate one or more embodiments of the invention and, together with the description, help to explain the invention. The drawings are not necessarily to scale, or inclusive of all elements of a system, emphasis instead generally being placed upon illustrating the concepts, structures, and techniques sought to be protected herein. In the drawings.

DETAILED DESCRIPTION

Embodiments of the presently described mainframe data flow optimization framework for data integration includes a structured model, driven by configuration files, which automatically allows files to be transferred as they are created from mainframes to one or more external systems. The mainframe data flow optimization framework is a self service utility.

Figure 1:
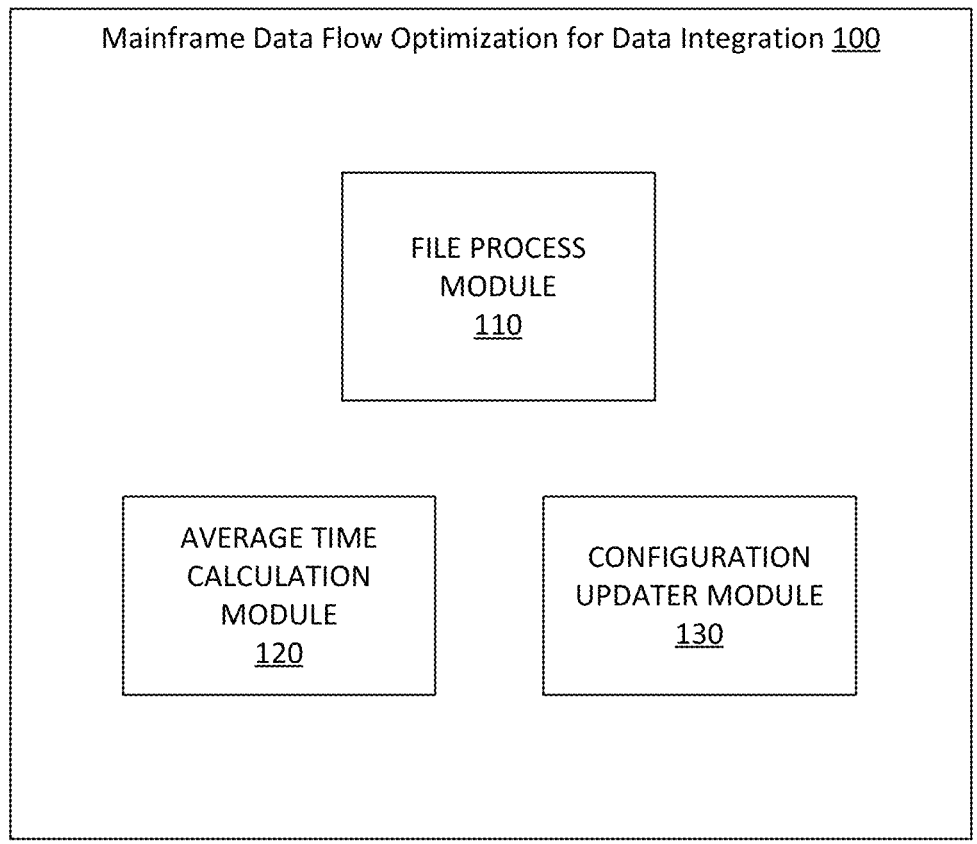
FIG. 1 is a block diagram of a system for mainframe dataflow optimization and data integration, according to an example embodiment.

FIG. 1 is a block diagram of a system 100 for mainframe dataflow optimization and data integration, according to an example embodiment. The system 100 includes a file process module 110 which performs all the acquired file processing to push applicable files to an external system. The system also includes an average time calculation module 120 which is used to calculate an end time of a job for determining if the file should be processed by the file process module 102 at this time. A configuration updater module 130 is used to add an entry to the list of files to be processed. The list provides details of the file and the target system, and is used to call a job. The called job updates the configuration parameters required to get the file to the desired location.

Figure 2:
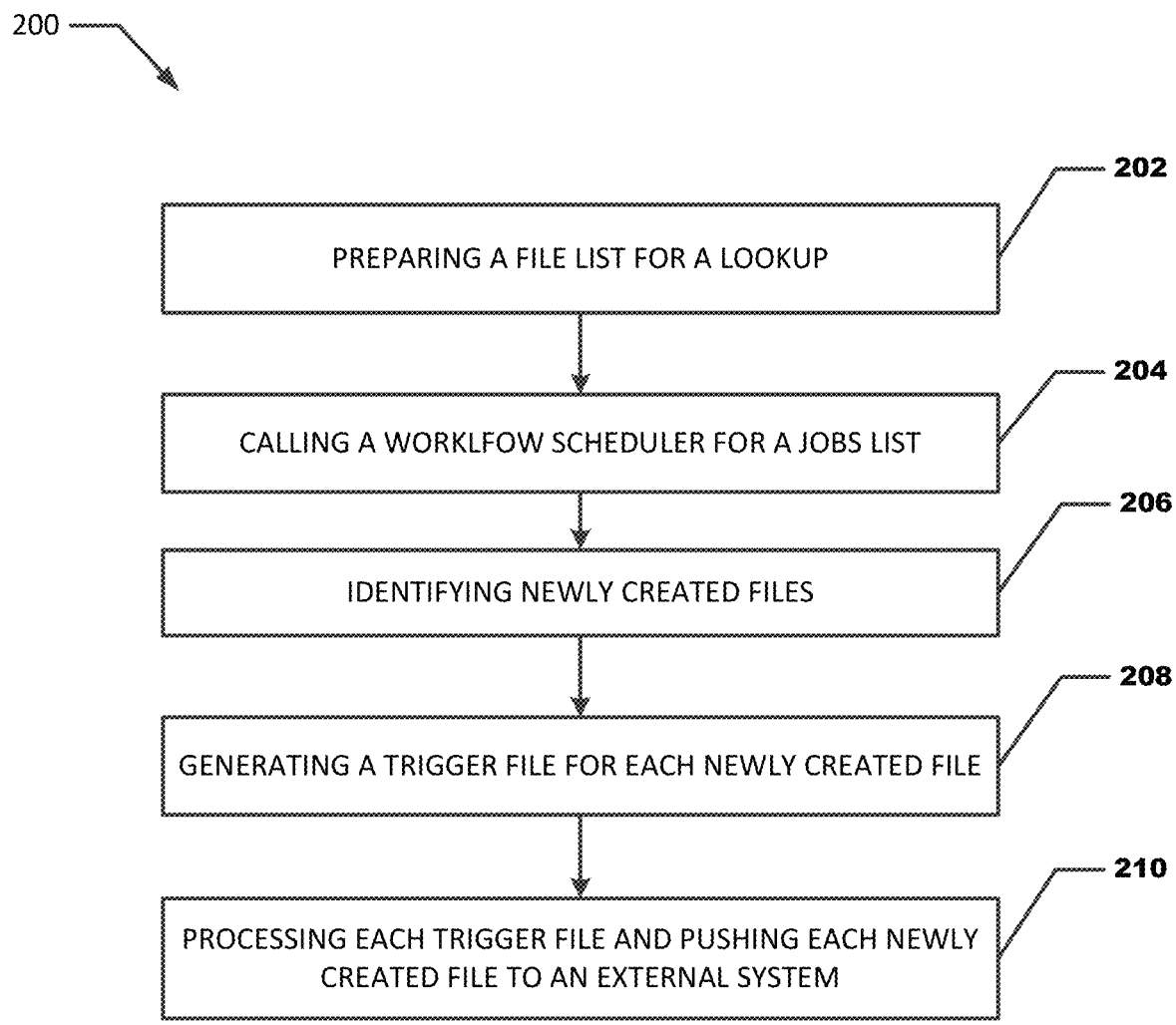
FIG. 2 is a flow diagram of a method for mainframe dataflow optimization and data integration, according to an example embodiment.

FIG. 2 is a flow diagram showing illustrative processing that can be implemented within a system for mainframe dataflow optimization and data integration in an exemplary embodiment. Rectangular elements are herein denoted "processing blocks" and represent computer software instructions or groups of instructions. Alternatively, the processing blocks may represent steps performed by functionally equivalent circuits such as a digital signal processor (DSP) circuit or an application specific integrated circuit (ASIC). The flow diagrams do not depict the syntax of any particular programming language but rather illustrate the functional information one of ordinary skill in the art requires to fabricate circuits or to generate computer software to perform the processing required of the particular apparatus. It should be noted that many routine program elements, such as initialization of loops and variables and the use of temporary variables may be omitted for clarity. The particular sequence of blocks described is illustrative only and can be varied without departing from the spirit of the concepts, structures, and techniques sought to be protected herein. Thus, unless otherwise stated, the blocks described below are unordered meaning that, when possible, the functions represented by the blocks can be performed in any convenient or desirable order.

The mainframe dataflow optimization and data integration methodology 200, in one embodiment, begins with processing block 202 which discloses preparing a file list for a lookup. This step is described in greater detail in the description of the flow diagram of FIG. 3.

Processing block 204 shows calling a workflow scheduler for a jobs list. Processing block 206 recites identifying newly created files. This step is described in greater detail in the description of the flow diagram of FIG. 4.

Processing block 208 discloses generating a trigger file for each file. This step is described in greater detail in the description of the flow diagram of FIG. 5.

Processing block 210 shows processing each trigger file and pushing each newly created file to an external system. This step is described in greater detail in the description of the flow diagram of FIG. 6.

Figure 3:
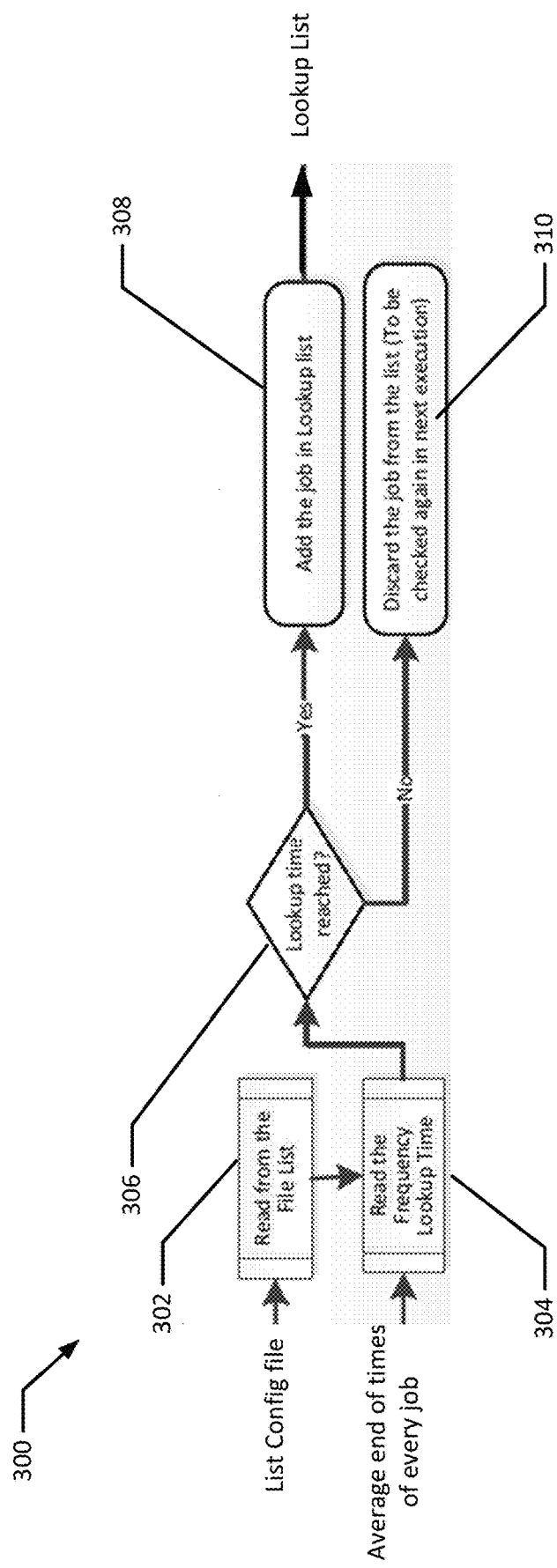
FIG. 3 is a flow diagram of a process for preparing a file list for lookup, according to an example embodiment.

Referring to FIG. 3, an example process 300 for preparing a file list used for lookups is shown. Process 300 begins with processing block 302 which discloses reading a list configuration file. This file is produced by the Configuration Updater module and includes a listing of files which are being updated, which may including multiple versions of a same file. This process may be repeated at pre-determined time intervals, for example, every fifteen minutes.

Processing block 304 shows the frequency lookup time is read for each file. This includes the average end times for every job being processed. This file containing the frequency lookup time is generated by the average time calculation module. At decision block 306, a determination is made regarding whether a lookup time for a file has been reached. When a lookup time for a file has been reached (i.e., the processing for that job is complete) then the job is added to a lookup list as shown in processing block 308. When a lookup time for a file has not been reached (i.e., the job is still in process) then the job is removed from the lookup list. This job will be checked again in a next iteration of this part of the process. This processing results in a collection of lookup commands for qualifying jobs, which is made available for the call that is made to a job scheduling/workflow automation software package.

Once the collection of lookup commands for qualifying jobs is available, a call is made to a job scheduling/workflow automation software package, such as CA7 sold by CA Technologies (formerly CA, Inc. and Computer Associates International, Inc.). This software is commonly used by large enterprises with mainframe computing platforms. The call includes the lookup commands for qualifying jobs. This action will result in a report being generated. The report will contain job information such as the file name, the time when the job was completed, and that a file is ready to be pushed to the appropriate external system. The report will also be made available to the Average Time Calculation module.

Figure 4:
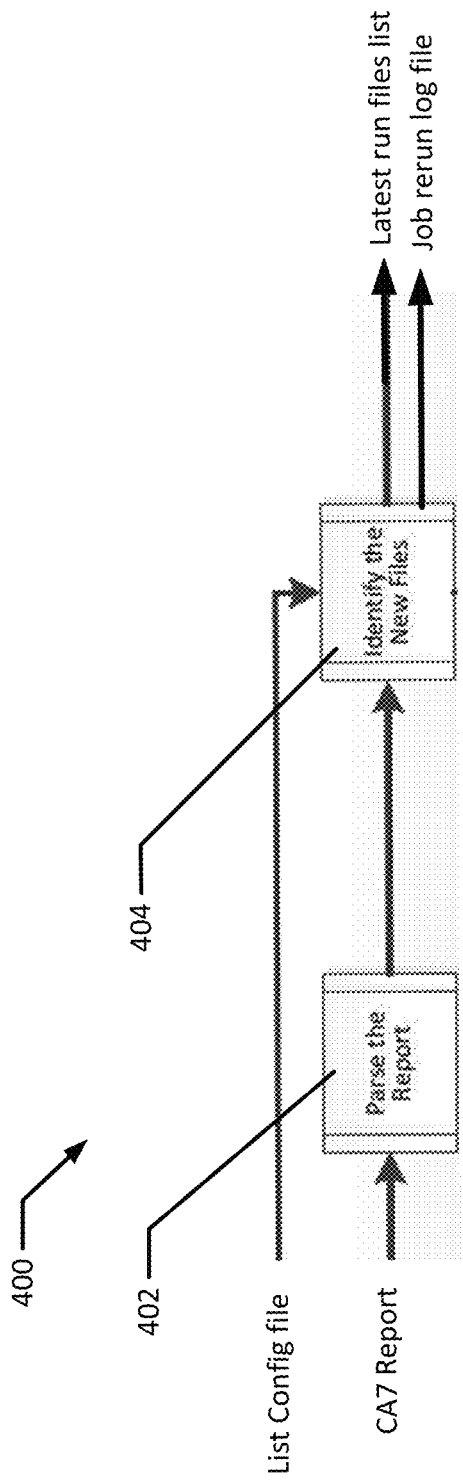
FIG. 4 is a flow diagram of a process for identifying newly created data files, according to an example embodiment.

Referring to FIG. 4, a process 400 for identifying newly created data files is shown. Processing block 402 shows the report from the job scheduling workflow automation software is parsed. Processing block 404 identifies the new files from the list configuration file and the parsed report, and a latest run files list is generated. Also generated is a job rerun log file. The latest run files list is made available to the process for generating trigger files. The latest run files list and the job rerun log file are made available to the process for generating trigger files.

Figure 5:
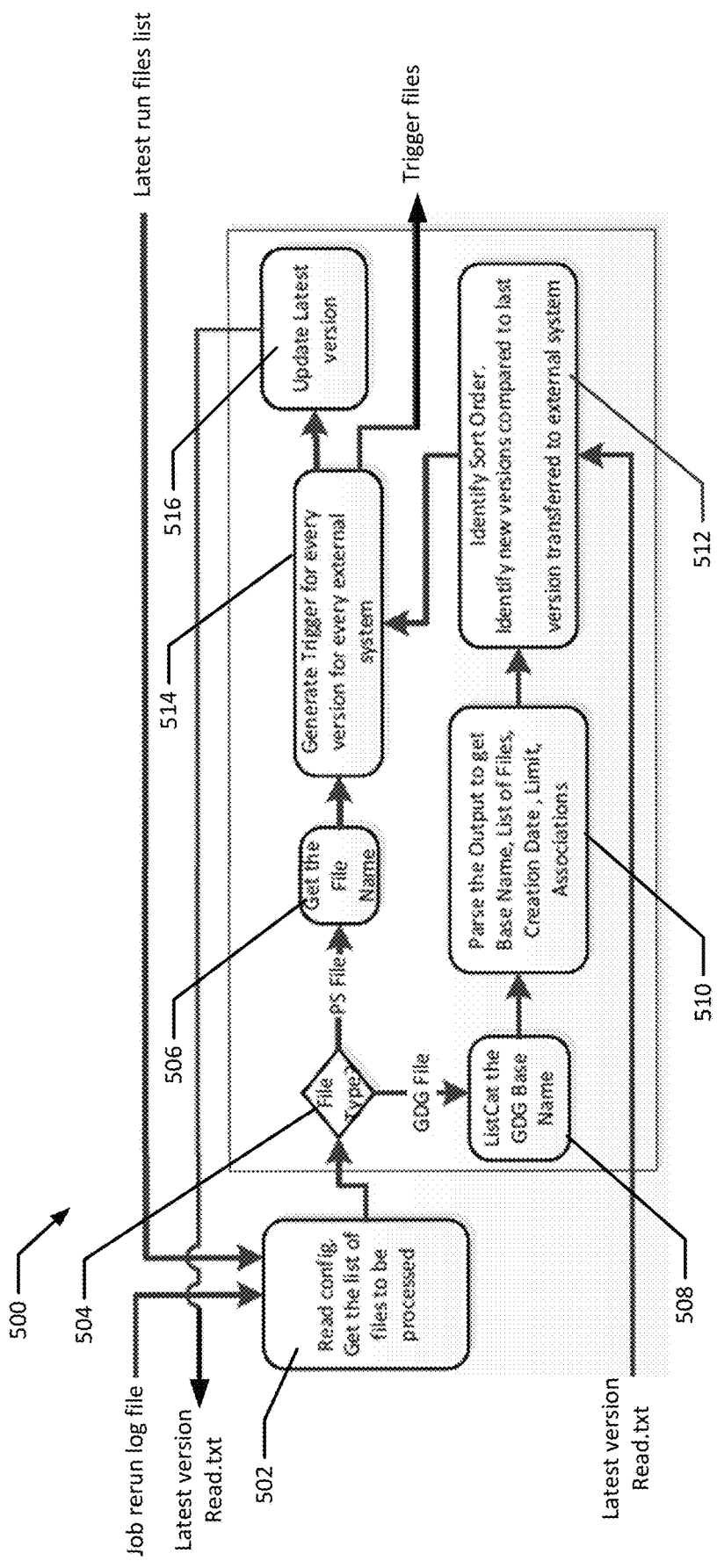
FIG. 5 is a flow diagram of a process for generating trigger files, according to an example embodiment.

FIG. 5 shows the method 500 for generating trigger files. Processing block 502 shows reading the latest run files list and the job rerun log file to obtain a list of files to be processed. This includes newly created files and files that need to be rerun through the process that didn't complete during an earlier iteration. At decision block 504 a determination is made regarding each file type and how to process the different file types. When the file type is a Physical Sequence (PS) file, processing continues with processing block 506, which shows the file name is acquired. A PS file is a listing of file names wherein there are not multiple versions of a same file.

When the file is a Generation Data Group (GDG) file, processing continues with processing block 508. A GDG file may be a listing of different versions of a same file. Processing block 508 shows that for Generation Data Group (GDG) an operation is performed. In one example, a Listcat operation is performed to obtain a list of entries from the GDG file. The list of entries may include multiple versions of a same file. Processing block 510 shows parsing this information to obtain a base name, a list of files, a creation date, a limit, and associations.

Processing block 512 uses data from processing block 510 as well as a latest version document to identify a sort order. New versions of files are compared to a last version that was transferred to an external system and are identified. This could include multiple different versions of a same file.

The results of the processing in processing block 506 and the results of the processing by processing block 512 are used by processing block 514 to generate a trigger file for every version of every document for each external system the document will be pushed to. The end result of this processing is a trigger document, which is a list of filenames that are ready to be sent to be processed and pushed to an external system.

Processing block 516 shows the information from processing block 514 is used to provide a update of the latest version of a file. This information is provided as part of a latest version read file which also includes information from the configuration updater module and is used during the identify sort order processing.

Figure 6:
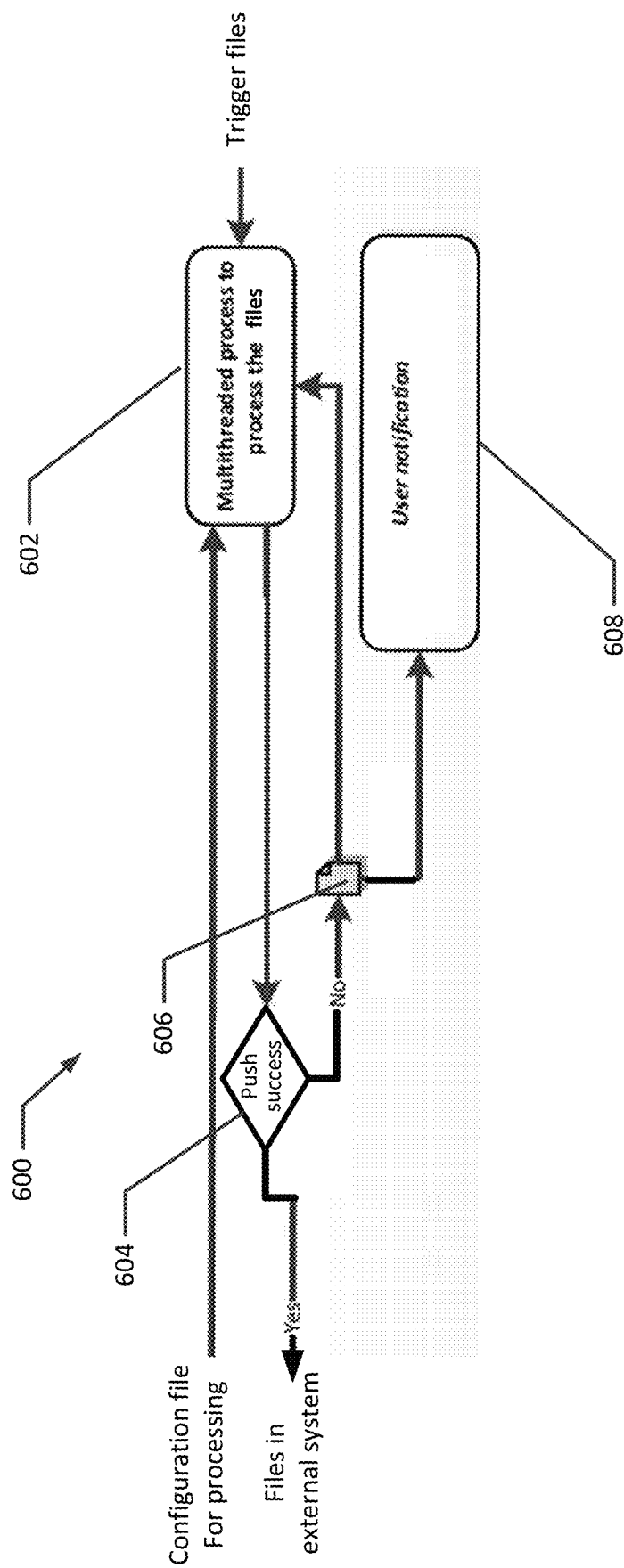
FIG. 6 is a flow diagram of a process for pushing files to an external system, according to an example embodiment.

The file process 600 is shown in FIG. 6. The trigger files as well as a configuration file for processing is executed by a multithreaded process as shown in processing block 602. The trigger file is processed and an attempt is made to push the newly created data file to an external system. As shown in decision block 604, if the attempt is successful, the processed file is pushed to an external system. In the event the attempt is unsuccessful, the user is notified, as shown in processing block 608 as well as factored into the multi-threaded process of processing block 602. The process may be repeated continuously.

Figure 7:
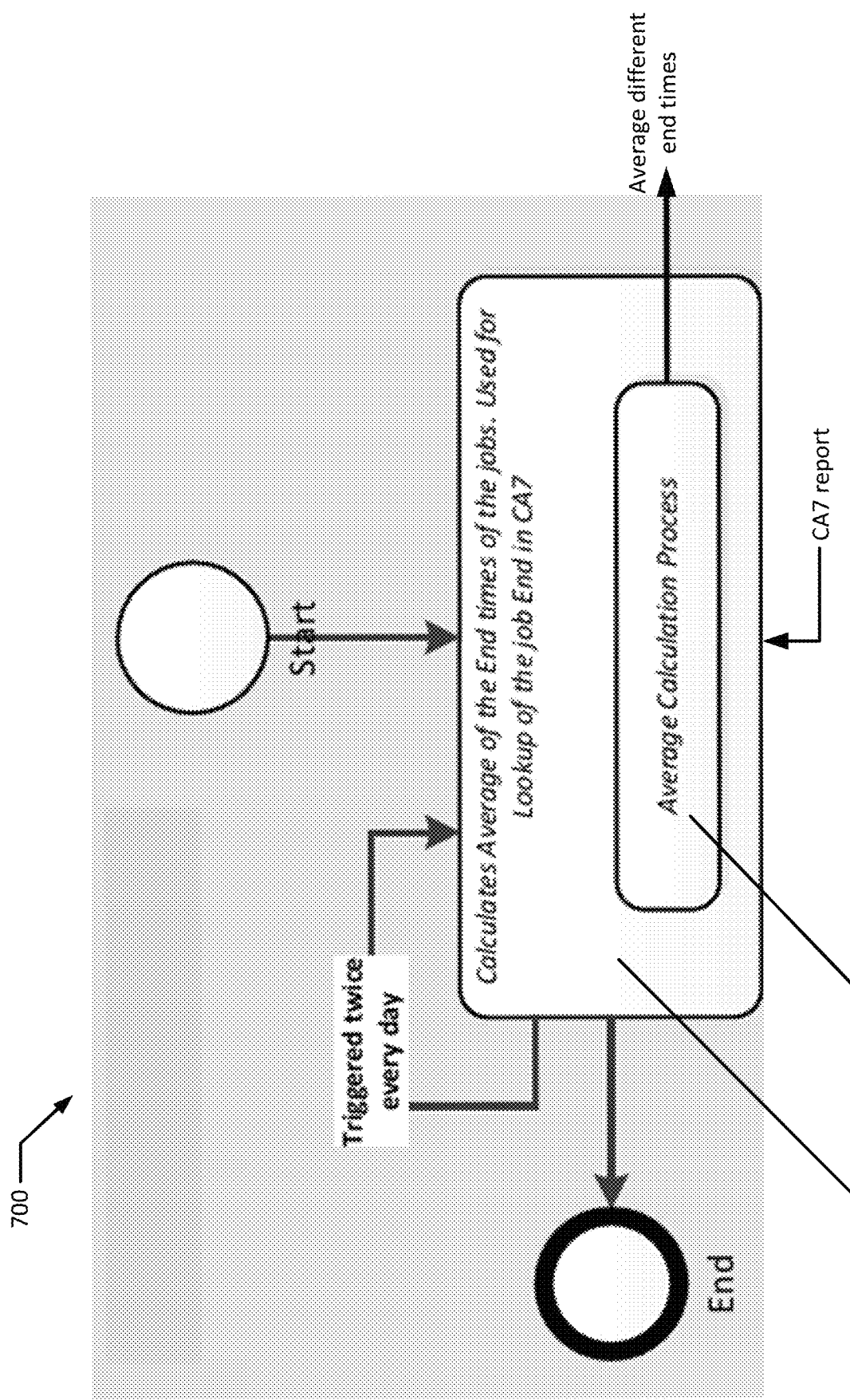
FIG. 7 is a flow diagram of a process for calculating an average end times of jobs, according to an example embodiment.

FIG. 7 shows a process 700 wherein the average time calculation module when executed calculates an average end times of jobs as shown in processing blocks 702 and 704. This processing uses information from the jobs list report. The end times of the jobs are determined and passed to the file process module. In one embodiment, this process may be triggered twice a day.

Figure 8:
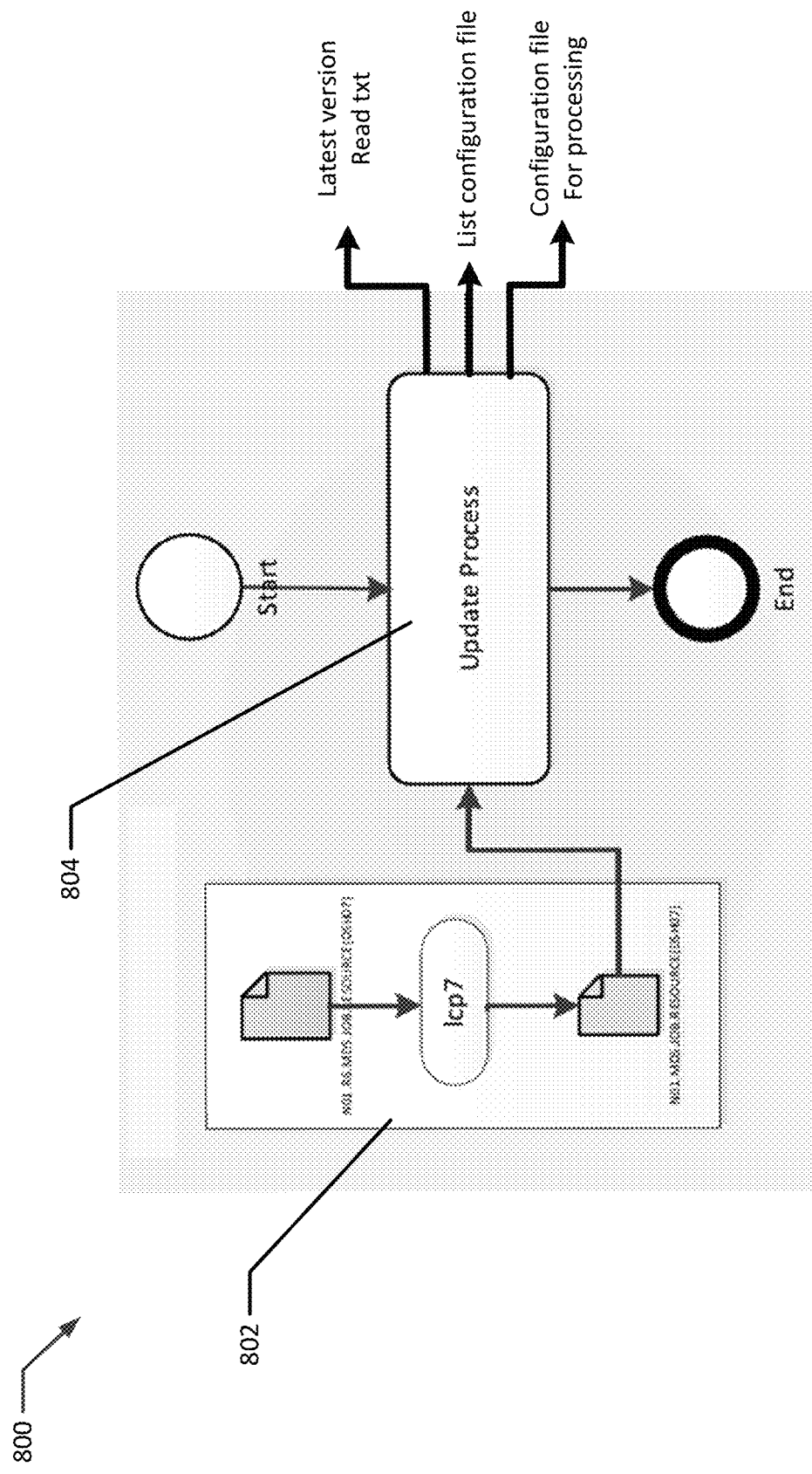
FIG. 8 is a flow diagram of a process for updating configuration files, according to an example embodiment.

FIG. 8 shows a process 800 wherein the configuration updater when executed processes a configuration update 804 from job resources 802, and passes the updated configuration information to the file process module. The information generated by processing block 804 includes latest version information used in the generation of trigger files, list configuration information used in preparing the files list for lookup and information for the configuration file for processing used in the file processing for pushing files to one or more external systems.

Figure 9:
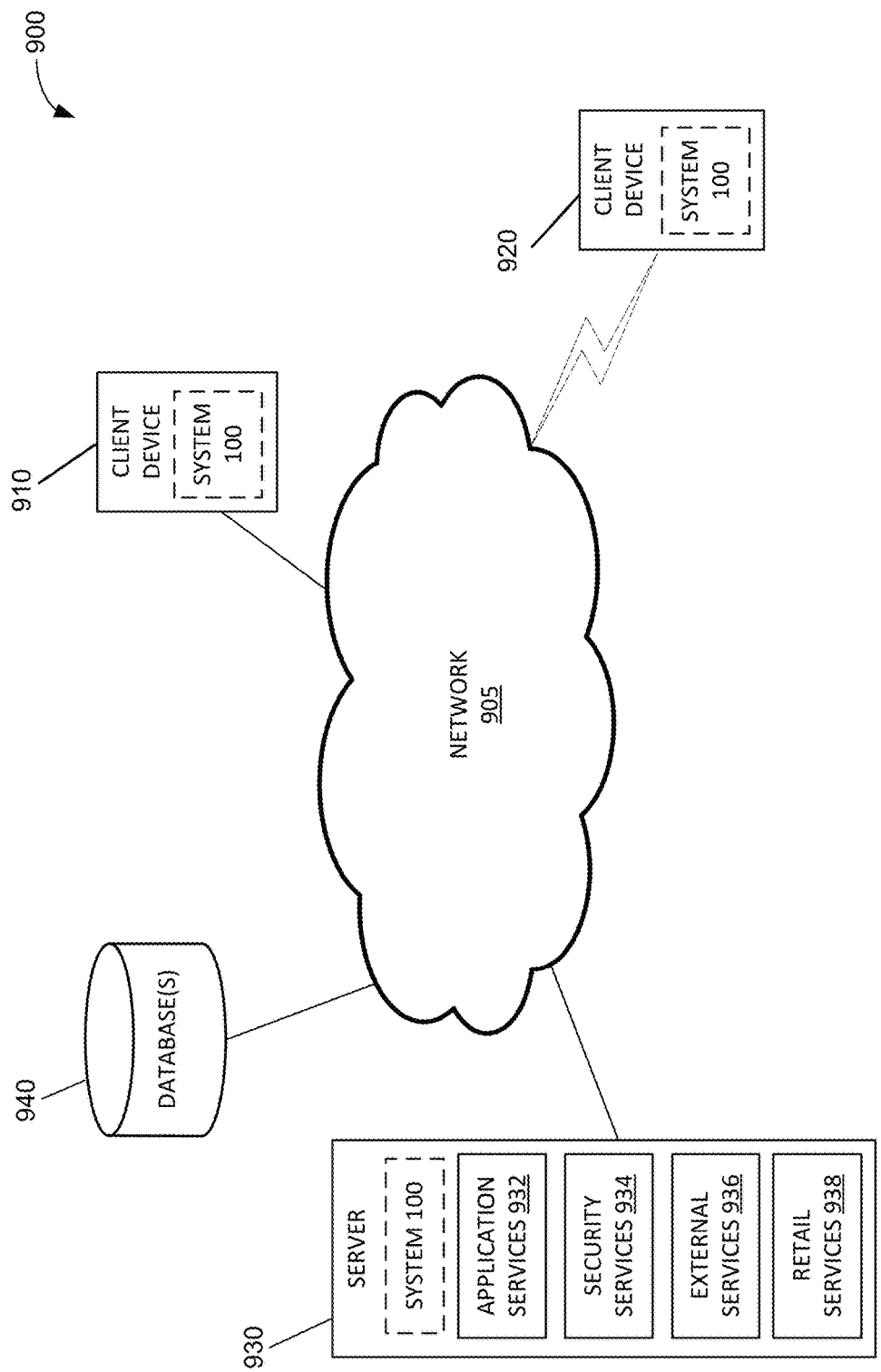
FIG. 9 is a diagram of an exemplary network environment suitable for a mainframe data flow optimization for data integration implementation of exemplary embodiments.

FIG. 9 illustrates a network diagram depicting a system 900 for implementing the customer feedback classification system, according to an example embodiment. The system 900 can include a network 905, multiple client devices, for example, client device 910, client device 920, a server 930, and database(s) 940. Each of the client devices 910, 920, server 930, and database(s) 940 is in communication with the network 905.

In an example embodiment, one or more portions of network 905 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

The client devices 910, 920 may comprise, but are not limited to, mobile devices, handheld devices, wireless devices, portable devices, wearable computers, cellular or mobile phones, portable digital assistants (PDAs), smart phones, smart watches, tablets, ultrabooks, netbooks, laptops, desktops, multi-processor systems, microprocessor-based or programmable consumer electronics, and the like. Each of client devices 910, 920 may connect to network 905 via a wired or wireless connection. In an example embodiment, the client devices 910, 920 may perform one or more of the functionalities of the customer feedback classification system 100 described herein, or transmit data or signals to the customer feedback classification system 100 described herein. For example, an individual may use the client device 910, 920 to place his or her comments about a product. The client device 910, 920 can include one or more components of computing device 700 of FIG. 10.

In an example embodiment, the customer feedback classification system 100 may be included at least in part on the client device 910, 920, and the client device 910, 920 performs one or more of the functionalities of the system described herein. In an example embodiment, the customer feedback classification system 100 may be included at least in part on the server 930, and the server 930 performs one or more of the functionalities of the dynamic delivery system 100 described herein.

The database(s) 940 comprise one or more storage devices for storing data and/or instructions (or code) for use by the server 930 and/or the client devices 910, 920. Each of the database(s) 940 and the server 930 is connected to the network 905 via a wired connection. Alternatively, one or more of the database(s) 940 and server 930 may be connected to the network 905 via a wireless connection. The server 930 comprise one or more computers or processors configured to communicate with the client devices 910, 920 via network 905. The server 930 can include one or more components of device 700 of FIG. 10. Server 930 hosts one or more software systems, applications or websites, including one or more components of the dynamic delivery system 100 described herein and/or facilitates access to the content of database(s) 940.

In an example embodiment, the server 930 also includes various software services that facilitate the functionalities of the customer feedback classification system 100. Database(s) 940 and server 930 may be located at one or more geographically distributed locations from each other or from client devices 910, 920. Alternatively, database(s) 940, 945 may be included within server 930.

Figure 10:
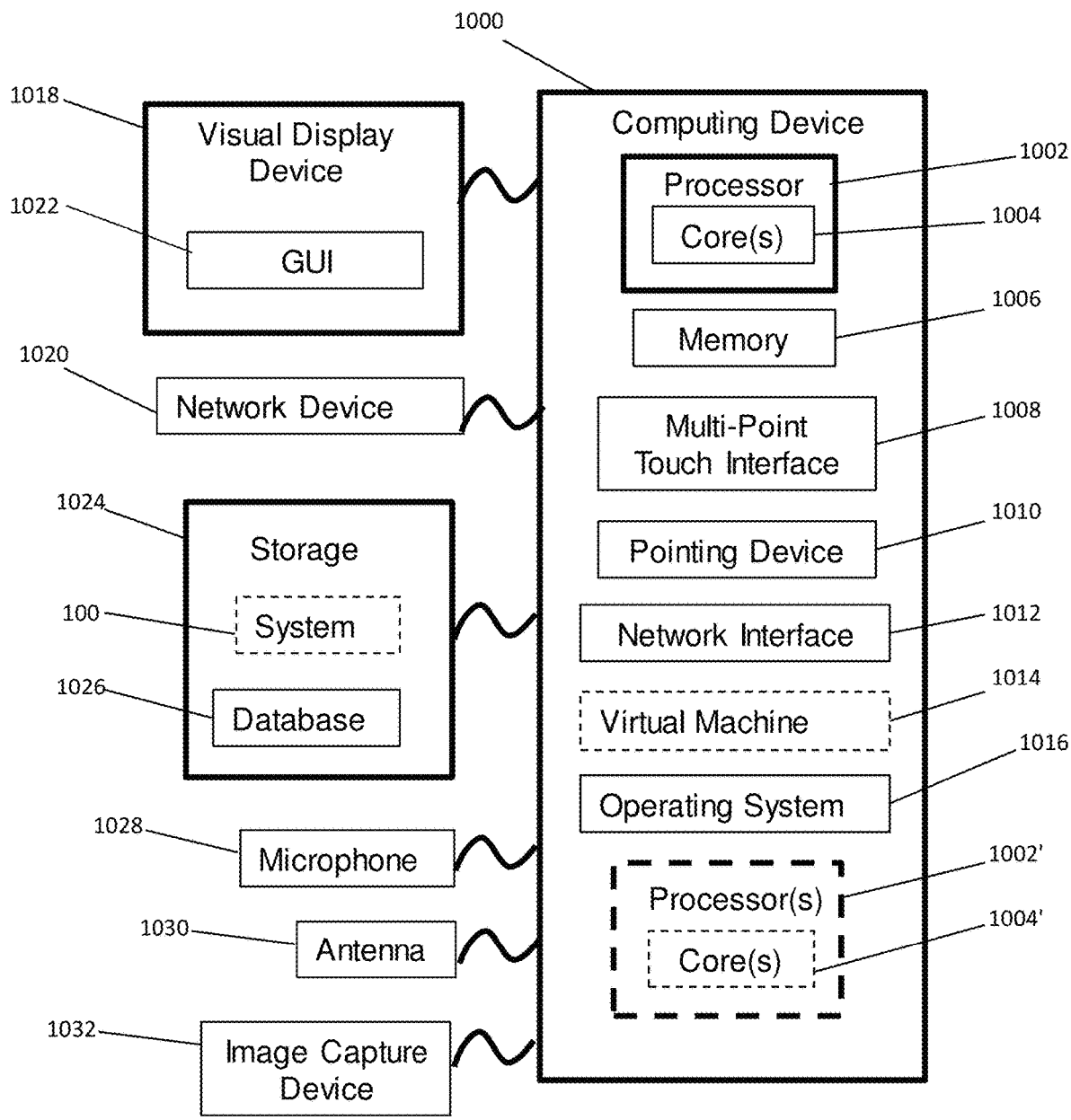
FIG. 10 is a block diagram of an exemplary computing device that may be used to implement exemplary embodiments described herein.

FIG. 10 is a block diagram of an exemplary computing device 1000 that can be used to perform one or more steps of the methods provided by exemplary embodiments. For example, computing device 1000 may be the client device 910, 920 and the server 930 as described in FIG. 9. The computing device 1000 includes one or more non-transitory computer-readable media for storing one or more computer-executable instructions or software for implementing exemplary embodiments. The non-transitory computer-readable media can include, but are not limited to, one or more types of hardware memory, non-transitory tangible media (for example, one or more magnetic storage disks, one or more optical disks, one or more USB flashdrives), and the like. For example, memory 1006 included in the computing device 1000 can store computer-readable and computer-executable instructions or software for implementing exemplary embodiments. The computing device 1000 also includes processor 1002 and associated core 1004, and optionally, one or more additional processor(s) 1002' and associated core(s) 1004' (for example, in the case of computer systems having multiple processors/cores), for executing computer-readable and computer-executable instructions or software stored in the memory 1006 and other programs for controlling system hardware. Processor 10902 and processor(s) 1002' can each be a single core processor or multiple core (704 and 1004') processor.

Virtualization can be employed in the computing device 1000 so that infrastructure and resources in the computing device can be shared dynamically. A virtual machine 1014 can be provided to handle a process running on multiple processors so that the process appears to be using only one computing resource rather than multiple computing resources. Multiple virtual machines can also be used with one processor.

Memory 1006 can include a computer system memory or random access memory, such as DRAM, SRAM, EDO RAM, and the like. Memory 1006 can include other types of memory as well, or combinations thereof. An individual can interact with the computing device 1000 through a visual display device 1018, such as a touch screen display or computer monitor, which can display one or more user interfaces 1019 for receiving data from the individual (e.g., order data and travel data). The visual display device 1018 can also display other aspects, elements and/or information or data associated with exemplary embodiments. The computing device 1000 can include other I/O devices for receiving input from a individual, for example, a keyboard or another suitable multi-point touch interface 1008, a pointing device 1010 (e.g., a pen, stylus, mouse, or trackpad). The keyboard 1008 and the pointing device 1010 can be coupled to the visual display device 1018. The computing device 1000 can include other suitable conventional I/O peripherals.

The computing device 1000 can also include one or more storage devices 1024, such as a hard-drive, CD-ROM, or other computer readable media, for storing data and computer-readable instructions and/or software, such as one or more modules of the system 100 shown in FIG. 1 that implements exemplary embodiments of the notification system as described herein, or portions thereof, which can be executed to generate user interface 1019 on display 1018. Exemplary storage device 1024 can also store one or more databases for storing suitable information required to implement exemplary embodiments. The databases can be updated by an individual or automatically at a suitable time to add, delete or update one or more items in the databases. Exemplary storage device 1024 can store one or more databases 926 for storing provisioned data, and other data/information used to implement exemplary embodiments of the systems and methods described herein.

The computing device 1000 can include a network interface 1012 configured to interface via one or more network devices 1022 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 1012 can include a built-in network adapter, network interface card, PCMCIA network card, card bus network adapter, wireless network adapter, USB network adapter, modem or another device suitable for interfacing the computing device 1000 to a type of network capable of communication and performing the operations described herein. Moreover, the computing device 900 can be a computer system, such as a workstation, desktop computer, server, laptop, handheld computer, tablet computer (e.g., the iPad® tablet computer), mobile computing or communication device (e.g., the iPhone® communication device), or other form of computing or telecommunications device that is capable of communication and that has sufficient processor power and memory capacity to perform the operations described herein.

The computing device 1000 can run an operating system 1016, such as versions of the Microsoft® Windows® operating systems, the different releases of the Unix and Linux operating systems, a version of the MacOS® for Macintosh computers, an embedded operating system, a real-time operating system, an open source operating system, a proprietary operating system, an operating systems for mobile computing devices, or another operating system capable of running on the computing device and performing the operations described herein. In exemplary embodiments, the operating system 1016 can be run in native mode or emulated mode. In an exemplary embodiment, the operating system 1016 can be run on one or more cloud machine instances.

The description is presented to enable a person skilled in the art to create and use a computer system configuration and related method and systems for dynamic delivery scheduling. Various modifications to the example embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention may be practiced without the use of these specific details. In other instances, well-known structures and processes are shown in block diagram form in order not to obscure the description of the invention with unnecessary detail. Thus, the present disclosure is not intended to be limited to the embodiments shown, but is to be accorded the widest scope consistent with the principles and features disclosed herein.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps can be replaced with a single element, component or step. Likewise, a single element, component or step can be replaced with a plurality of elements, components or steps that serve the same purpose. Moreover, while exemplary embodiments have been shown and described with references to particular embodiments thereof, those of ordinary skill in the art will understand that various substitutions and alterations in form and detail can be made therein without departing from the scope of the invention. Further still, other aspects, functions and advantages are also within the scope of the invention.

Exemplary flowcharts have been provided herein for illustrative purposes and are non-limiting examples of methods. One of ordinary skill in the art will recognize that exemplary methods can include more or fewer steps than those illustrated in the exemplary flowcharts, and that the steps in the exemplary flowcharts can be performed in a different order than the order shown in the illustrative flowcharts.

Having described certain embodiments, which serve to illustrate various concepts, structures, and techniques sought to be protected herein, it will be apparent to those of ordinary skill in the art that other embodiments incorporating these concepts, structures, and techniques may be used. Elements of different embodiments described hereinabove may be combined to form other embodiments not specifically set forth above and, further, elements described in the context of a single embodiment may be provided separately or in any suitable sub-combination. Accordingly, it is submitted that the scope of protection sought herein should not be limited to the described embodiments but rather should be limited only by the spirit and scope of the following claims.

What is claimed is:

1. A system for mainframe data flow optimization and integration, the system comprising:
   a computing device configured to execute a file process module, an average time calculation module, and a configuration updater module, wherein the file process module when executed:
   prepares a file list for a lookup;
   calls a workflow scheduler for a jobs list based on the file list for lookup;

identifies newly created data files from a plurality of different systems from the jobs list;
generates a trigger file for each newly created data file for every external system that requires the newly created file; and
processes each trigger file and pushes the newly created files to an external system.

2. The system of claim 1 wherein the average time calculation module when executed calculates an average end times of jobs and passes the end times of the jobs to the file process module.

3. The system of claim 1 wherein the configuration updater module when executed processes a configuration update and passes the updated configuration information to the file process module.

4. The system of claim 1 wherein the file list for lookup is prepared when the file process module:
reads a list configuration file;
reads a frequency lookup time file;
determines whether a lookup time for a file has been reached; and
when a lookup time for a file has been reached then adds the job to a lookup list and when a lookup time for a file has not been reached then discards the job from the lookup list.

5. The system of claim 1 wherein the newly created data files are identified when the file process module:
parses a job list received from the workflow scheduler; and
identifies newly created files.

6. The system of claim 1 wherein the trigger file for each newly created file is generated when the file process module:
obtains a list of files to be processed; and
determines a file type of each file in the list of files to be processed.

7. The system of claim 6 wherein:
when the file type is a Physical Sequence (PS) file, then the file process module:
obtains a file name;
generates a trigger file for each version of the file for each external system; and
updates the latest version; and
when the file type is a Generation Data Group (GDG) file, then the file process module processes the GDG file;
parses the output to get a base name, a list of files, a creation date, a limit and associations;
identifies a sort order;
identifies new versions of files compared to a last version of the files transferred to an external system;
generates a trigger file for each new version of the file for each external system; and
updates the latest version of the file.

8. The system of claim 1 wherein the file process module:
processes each trigger file;
pushes the processed file to an external system; and
provides user notification when the push operation fails.

9. The system of claim 1 wherein the file process module prepares the file list for a lookup at predetermined time intervals.

10. A computer-implemented method for mainframe data flow optimization and integration, the method comprising:
preparing a file list for a lookup at a file process module;
calling a workflow scheduler for a jobs list based on the file list for lookup;
identifying newly created data files from a plurality of different systems from the jobs list;
generating a trigger file for each file for each newly created data file for every external system that requires the newly created file; and
processing each trigger file and pushing the newly created files to external systems.

11. The method of claim 10 further comprising calculating an average end times of jobs and passing the average end time of jobs to the file process module.

12. The method of claim 10 further comprising processing a configuration update and passing the updated configuration information to the file process module.

13. The method of claim 10 wherein the preparing a file list for lookup comprises:
reading a list configuration file;
reading a frequency lookup time file;
determining whether a lookup time for a file has been reached; and
when a lookup time for a file has been reached then adding the job to a lookup list, and when a lookup time for a file has not been reached then discarding the job from the list.

14. The method of claim 10 wherein the identifying newly created data files comprises parsing a job list received from the workflow scheduler and identifying new files.

15. The method of claim 10 wherein the generating a trigger file for each file comprises:
obtaining a list of files to be processed; and
determining a file type of each file in the list of files to be processed.

16. The method of claim 15 wherein:
when the file type is a Physical Sequence (PS) file, then:
obtaining a file name;
generating a trigger file for each version of the file for each external system; and
updating the latest version; and
when the file type is a Generation Data Group (GDG) file, then:
processing the GDG file;
parsing the output to get a base name, a list of files, a creation date, a limit and associations;
identifying a sort order;
identifying new versions of files compared to a last version of the file transferred to an external system;
generating a trigger file for each new version of the file for each external system; and
updating a latest version of the file.

17. The method of claim 10 further comprising:
processing each trigger file;
pushing the newly created data files to an external system; and
providing user notification when the push operation fails.

18. The method of claim 10 wherein the preparing a file list for a lookup is executed at predetermined time intervals.

19. A non-transitory machine-readable medium storing instructions executable by a processing device, wherein execution of the instructions causes the processing device to implement a method for mainframe data flow optimization and integration, the method comprising:
preparing a file list for a lookup;
calling a workflow scheduler for a jobs list based on the file list for lookup;
identifying newly created data files from a plurality of different systems from the jobs list;
generating a trigger file for each file for each newly created data file for every external system; and
processing each trigger file and pushing the newly created files to external systems.

20. The non-transitory machine readable medium of claim 19 further comprising instructions for:
  processing each trigger file;
  pushing the newly created data files to an external system; and
  providing user notification when the push operation fails.

\* \* \* \* \*